US007621243B2

(12) United States Patent
Sugiura et al.

(10) Patent No.: US 7,621,243 B2
(45) Date of Patent: Nov. 24, 2009

(54) VALVE TIMING CONTROLLER (75) Inventors: Taei Sugiura, Anjo (JP); Yasushi Morii, Nagoya (JP)

(73) Assignee: Denso Corporation, Kariya (JP)

( * ) Notice: Subject to any disclaimer, the term of this patent is extended or adjusted under 35 U.S.C. 154(b) by 454 days.

(21) Appl. No.: 11/705,517

(22) Filed: Feb. 13, 2007

(65) Prior Publication Data
US 2007/0202981 A1    Aug. 30, 2007

(30) Foreign Application Priority Data
Feb. 24, 2006    (JP)    ............................ 2006-049293

(51) Int. Cl.
F01L 1/34    (2006.01)
(52) U.S. Cl. ................. 123/90.17; 123/90.15; 464/160; 475/331
(58) Field of Classification Search ............... 123/90.15, 123/90.16, 90.17, 90.18, 90.27, 90.65, 90.66, 123/90.67, 90.31; 464/1, 2, 160; 475/331, 475/338
See application file for complete search history.

(56) References Cited

U.S. PATENT DOCUMENTS 5,293,845 A    3/1994    Yamazaki et al.

7,377,242 B2 *    5/2008    Uehama et al. .......... 123/90.17

FOREIGN PATENT DOCUMENTS

| DE | 4110195 | 10/1992 |
|----|---------|---------|
| JP | 05-312011 | 11/1993 |

OTHER PUBLICATIONS

Japanese Office Action dated Aug. 25, 2009, issued in counterpart Japanese Application No. 2006-49293, with English translation.

* cited by examiner

*Primary Examiner*—Ching Chang
(74) *Attorney, Agent, or Firm*—Nixon & Vanderhye, PC (57) ABSTRACT

A valve timing controller includes a first rotary element having a first gear part, a second rotary element having a second gear part, and a planetary gear including a third gear part and a fourth gear part which respectively engage with the first gear part and the second gear part. The planetary gear performs a planetary motion to vary a relative rotational phase between the first rotary element and the second rotary element. The valve timing controller further includes a supporting member supporting the planetary gear in such a manner that the planetary gear is slidable in its axial direction between the first rotary element and the second rotary element, and an elastic member restricting a displacement of the planetary gear in its axial direction.

6 Claims, 6 Drawing Sheets

VALVE TIMING CONTROLLER

CROSS-REFERENCE TO RELATED APPLICATION

This application is based on Japanese Patent Applications No. 2006-49293 filed on Feb. 24, 2006, the disclosure of which is incorporated herein by reference.

FIELD OF THE INVENTION

The present invention relates to a valve timing controller, and particularly to a valve timing controller for an internal combustion engine for adjusting valve timing of at least one of an intake valve and an exhaust valve which is opened/closed by a camshaft by torque transmitted from a crankshaft.

BACKGROUND OF THE INVENTION

There is conventionally known a valve timing controller for shifting a relative rotational phase between two rotary elements, which rotate respectively in response to the crankshaft and the camshaft, by a differential gear system composed mainly of a planetary gear. DE-4110195C2 discloses a valve timing controller which includes a sprocket rotating in response to a crankshaft, and a gear element rotating in response to the camshaft. The valve timing controller has a differential gear system composed mainly of a planetary gear between the sprocket and the camshaft. This valve timing controller converts a planetary motion of the planetary gear into a relative rotational motion of the camshaft to the sprocket. Two rotary elements include two internal gears, and the planetary gear has two external gears. These external and internal gears respectively engage with each other at one part of teeth thereof.

There is, therefore, a possibility that the planetary gear is inclined comparatively largely in the thrust direction by transmission of the torque by the planetary motion of the external gear part and the internal gear part. In particular, when the relative rotational movement is performed in high velocity, there is a possibility that a minor irregular friction may be caused by colliding of the gear part with the sprocket. As a result, because of the generation of the minor irregular friction, there may be a possibility that the normal relative rotational movement state is not maintained.

Furthermore, since the gear part and the sprocket collide with each other in a state both of them being in inclined state, as described above, a stress is locally increased at the meshing teeth each other, causing a factor of abrasion or damage.

SUMMARY OF THE INVENTION

The present invention is made in view of the above matters, and it is an object of the present invention to provide a valve timing controller which can restrict a thrust movement of the gear element.

According to the present invention, a valve timing controller includes a first rotary element having a first gear part, a second rotary element having a second gear part, and a planetary gear including a third gear part and a fourth gear part which respectively engage with the first gear part and the second gear part. The planetary gear performs a planetary motion to vary a relative rotational phase between the first rotary element and the second rotary element. The valve timing controller further includes a supporting member supporting the planetary gear in such a manner that the planetary gear is slidable in its axial direction between the first rotary element and the second rotary element, and an elastic member restricting a displacement of the planetary gear in its axial direction.

BRIEF DESCRIPTION OF THE DRAWINGS

Other objects, features, and advantages of the present invention will become more apparent from the following detailed description made with reference to the accompanying drawings, in which like portions are designated by like reference numbers and in which.

DETAILED DESCRIPTION OF EXAMPLE EMBODIMENTS

Hereinafter, embodiments of the valve timing controller according to the present invention preferably implemented in a valve timing controller for an internal combustion engine will be described with reference to the drawings.

Figure 1:
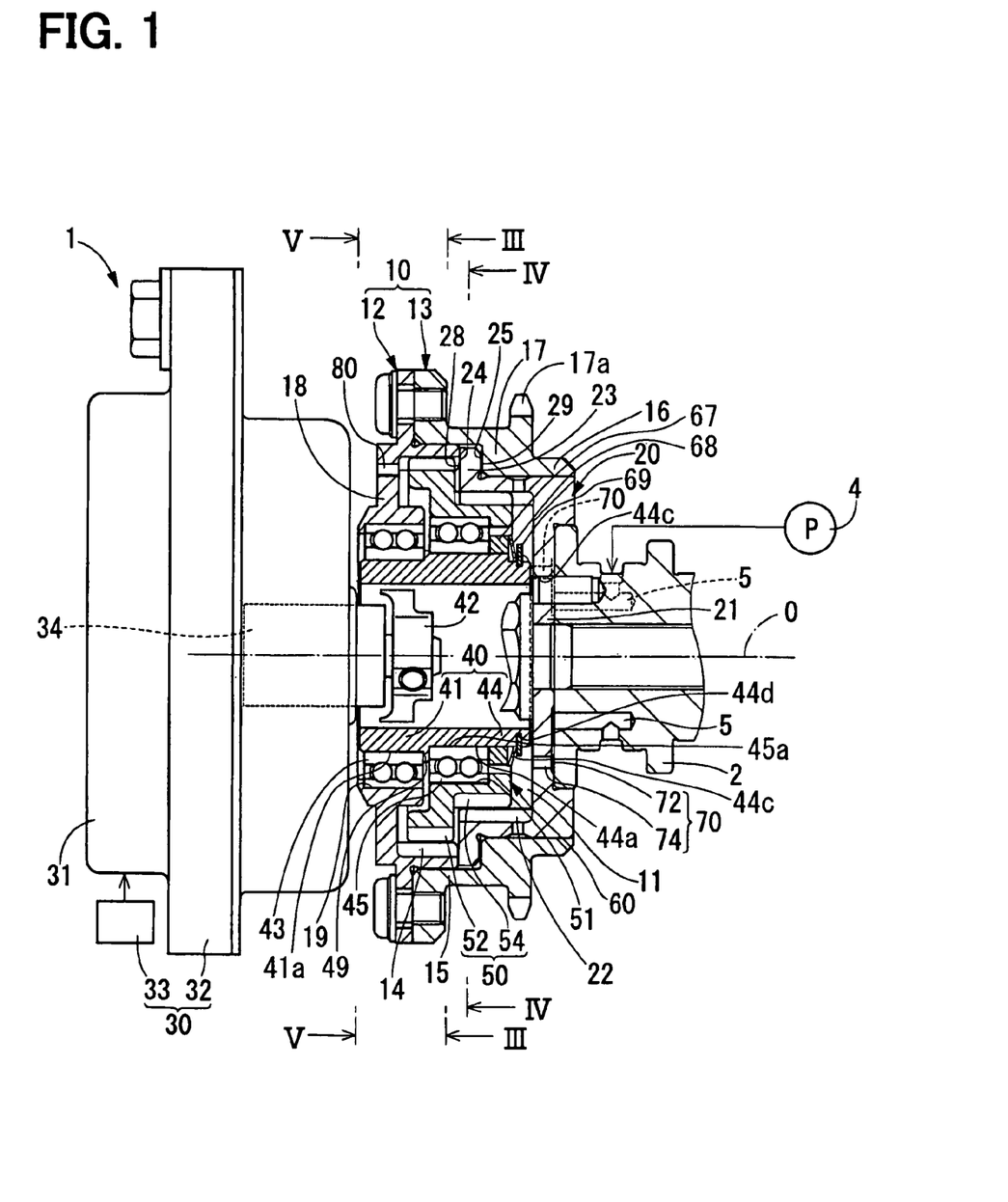
FIG. 1 is a cross sectional view showing a valve timing controller according to an embodiment of the present invention.

As shown in FIG. 1, a valve timing controller 1 is provided in a transmission system which transmits engine torque to a camshaft 2 from a crankshaft (not shown) of the engine. The valve timing controller 1 adjusts the valve timing of an intake valve of the engine by shifting a relative rotational phase between the crankshaft and the camshaft 2.

The valve timing controller 1 is provided with a driving-side rotary element 10, a driven-side rotary element 20, a control unit 30, a planetary frame 40, and a planetary gear 50.

The driving-side rotary element 10 and the driven-side rotary element 20 jointly form an accommodating space 11 for the planetary frame 40, the planetary gear 50, and the like inside thereof.

Figure 3:
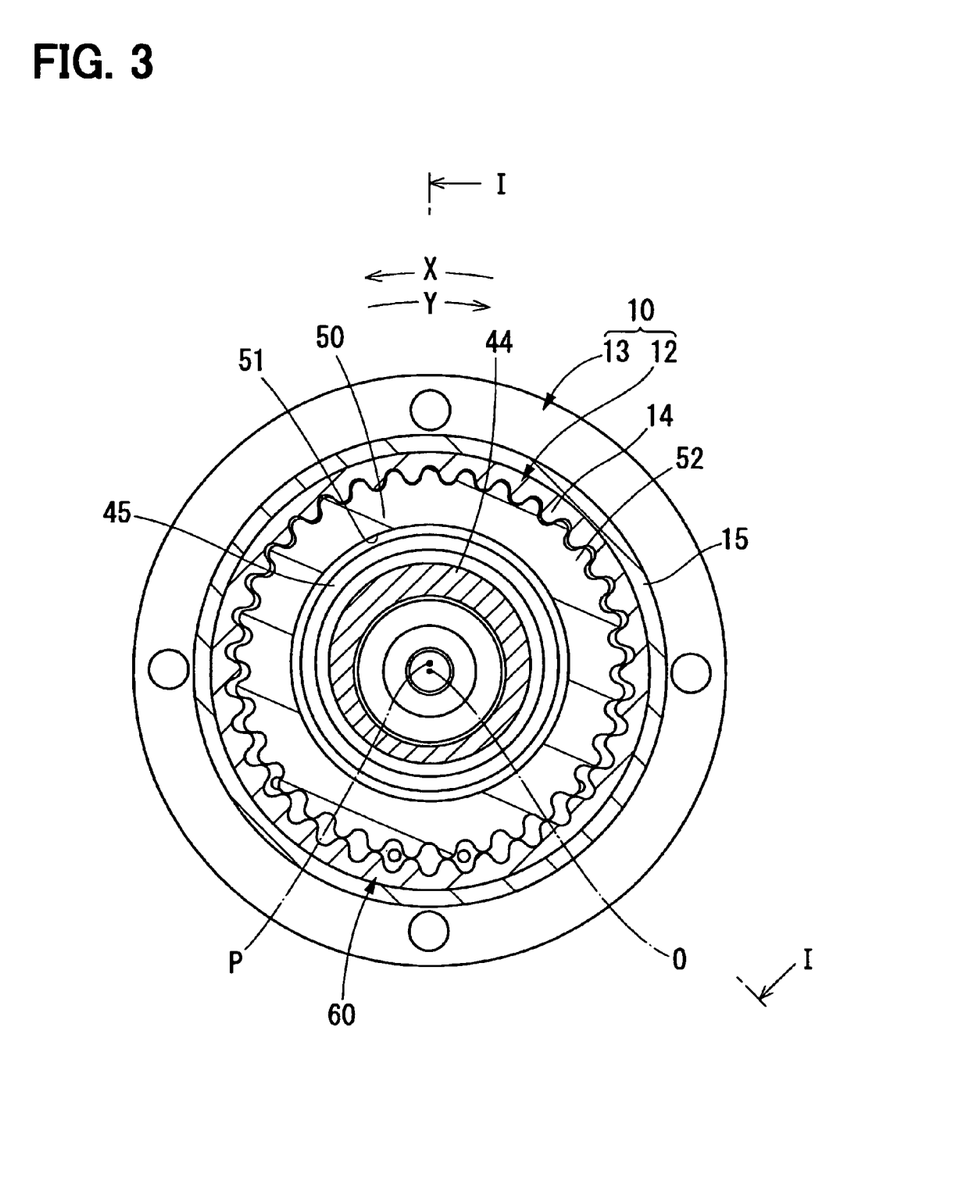
FIG. 3 is a cross sectional view taken along a line III-III in FIG. 1.

As shown in FIGS. 1 and 3, the driving-side rotary element 10 is constituted by coaxially assembling a tubular gear member 12 with a bottom and a two-stepped tubular sprocket 13. On a peripheral wall part of the gear member 12, a tip circle forms a driving-side internal gear part 14 existing on the inner peripheral side of a bottom circle. The gear member 12 is fixed by screwing to the sprocket 13 in a state where an outer peripheral wall of the driving-side internal gear part 14 is engaged with the inner peripheral wall of a larger diameter portion 15 of the sprocket 13. In a step part 17 connecting between the larger diameter portion 15 and a smaller diameter portion 16 in the sprocket 13, a plurality of teeth 17a are provided in a form extruding to the outer periphery side. A timing chain is wound around between these teeth 17a and a plurality of teeth of the crankshaft. Therefore, when the engine torque outputted from the crankshaft is inputted into the sprocket 13 through the timing chain, the driving-side rotary element 10 moves with the crankshaft to rotate around a rotational axial line O keeping the relative phase relative to the axis. The rotational direction of the driving-side rotary element 10 is a counterclockwise direction as shown in FIG. 3.

Figure 4:
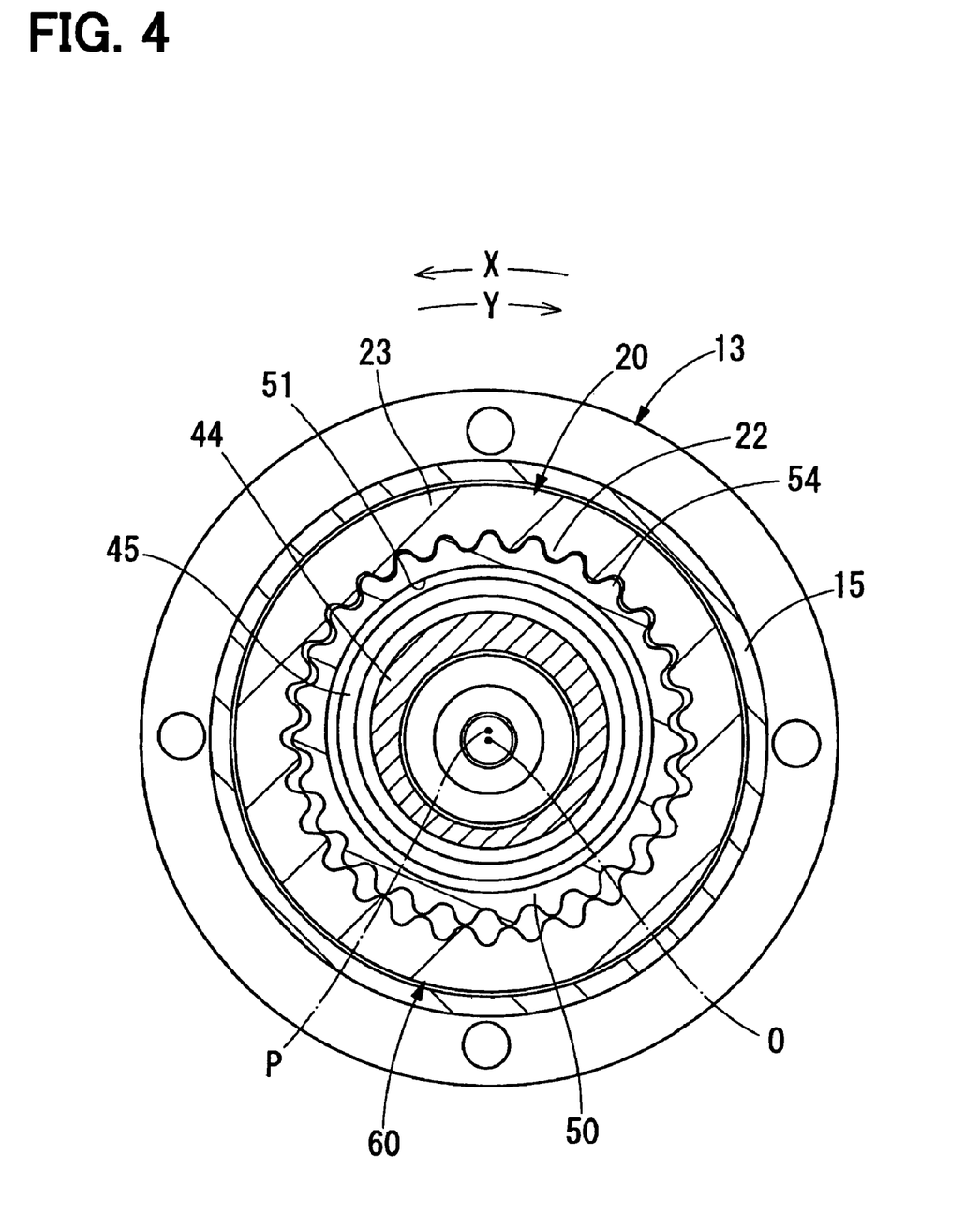
FIG. 4 is a cross sectional view taken along a line IV-IV in FIG. 1.

As shown in FIGS. 1 and 4, the driven-side rotary element 20 is of a tubular type with a bottom, and is coaxially arranged with the driving-side rotary element 10 and the camshaft 2. A bottom wall part of the driven-side rotary element 20 forms a fixed portion 21 which is fixed by a bolt on an end part of the camshaft 2. By the bolt fixation, the driven-side rotary element 20 can rotate around the rotational axial line O keeping the relative rotational phase to the corresponding camshaft 2, moving together with the camshaft 2, and can rotate relative to the driving-side rotary element 10. The relative rotational direction toward which the driven-side rotary element 20 advances relative to the driving-side rotary element 10 is referred to as an advance direction X, and the relative rotational direction toward which the driven-side rotary element 20 retards relative to the driving-side rotary element 10 is referred to as a retard direction Y, hereinafter.

The peripheral wall part of the driven-side rotary element 20 has a driven-side internal gear part 22, in which the tip circle exists on the inner periphery side of the bottom circle. Here, the inside diameter of the driven-side internal gear part 22 is set smaller than the inside diameter of the driving-side internal gear part 14, and the number of the teeth of the driven-side internal gear part 22 is set smaller than the number of the teeth of the driving-side internal gear part 14. The outer peripheral wall of the driven-side internal gear part 22 is engaged with the smaller diameter portion 16 and the inner peripheral wall of the step part 17 in the sprocket 13. Hence, the driven-side rotary element 20 relatively rotatably supports the driving-side rotary element 10 from the inner periphery side.

In the driven-side internal gear part 22, a flange part 23 protruding toward the outer periphery side is provided on an end part opposite the fixed portion 21. The flange part 23 is interposed tightly between an end surface 24 of the driving-side internal gear part 14 and an end surface 25 of the step part 17, which oppose with each other in the axial direction. By this tightly interposed form, in the driven-side internal gear part 22, both surfaces 28 and 29 of the flange part 23 relatively rotatably contact with the end surfaces 24 and 25 facing toward the axial direction of the driving-side rotary element 10. The driven-side internal gear part 22 neighbors the driving-side internal gear part 14 with a deviation in the axial direction in a state where the axial direction relative displacement is regulated. The flange part 23 regulates the axial relative displacement and the relative rotational direction displacement of the driven-side internal gear part 22.

As shown in FIG. 1, a control unit 30 includes an electric motor 32, an electric current control circuit 33, and the like. The electric motor 32 is arranged on the opposite side of the camshaft 2 with respect to the rotary elements 10 and 20 interposed therebetween. The electric motor 32 is an electric motor, for example, a brushless motor and the like, and includes a motor case 31 fixed to the engine via a stay (not shown) and a motor shaft 34 supported rotatably in direct and reverse directions by the motor case 31.

The electric current control circuit 33 is formed of an electric circuit such as a microcomputer and the like, is arranged outside or inside of the motor case 31, and is electrically connected with the electric motor 32. The electric current control circuit 33 controls an electric current flow to a coil (not shown) of the electric motor 32 in accordance with an operating condition of the engine. By the electric current control, the electric motor 32 forms a rotating magnetic field around the motor shaft 34, and outputs rotating torque from the motor shaft 34 in the directions X and Y (refer to FIG. 5) in accordance with the direction of the rotating magnetic field.

Figure 5:
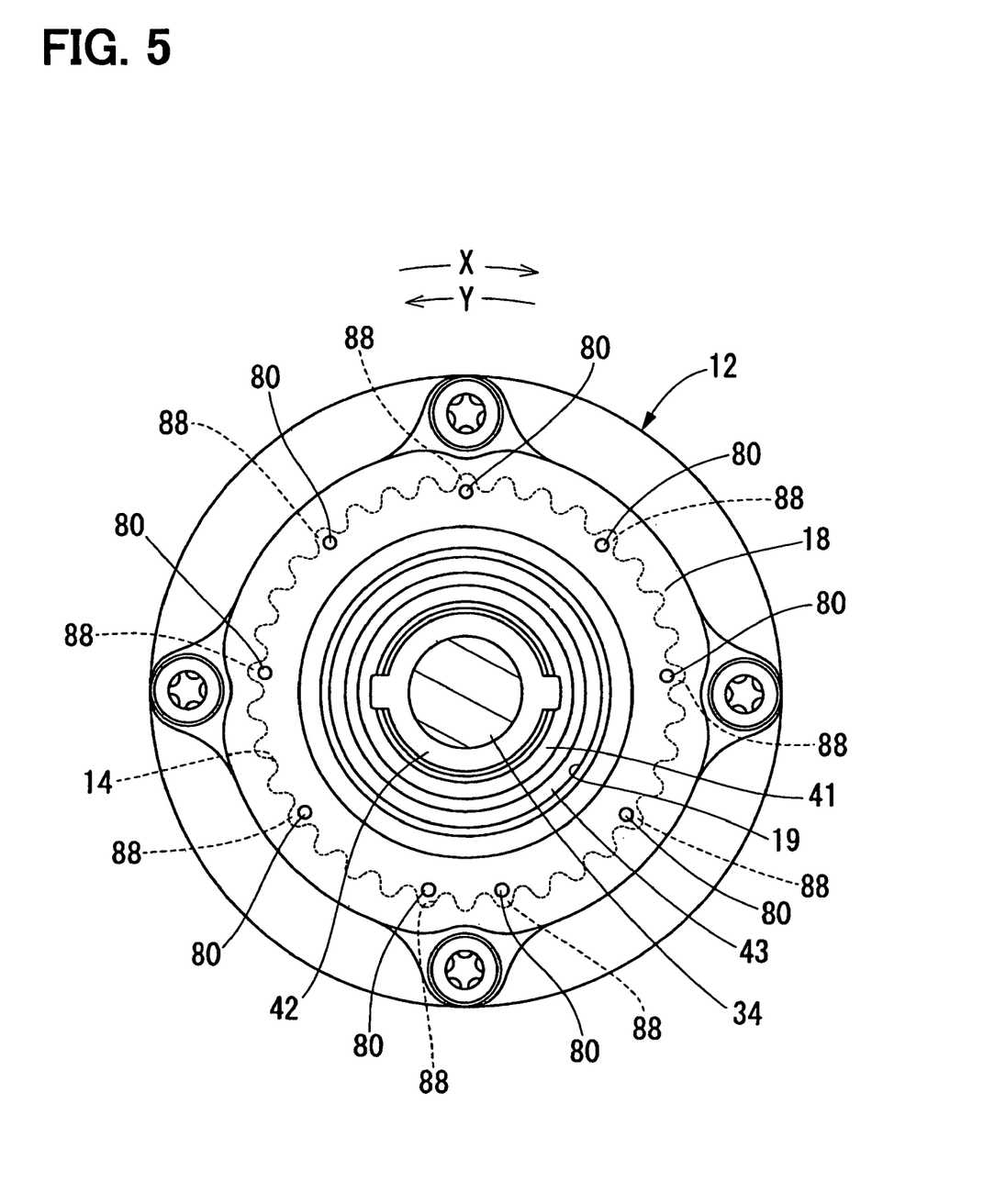
FIG. 5 is a cross sectional view taken along a line V-V in FIG. 1.

As shown in FIGS. 1 and 5, an input part 41 of the planetary frame 40 is of a tubular type coaxial with the rotary elements 10 and 20 and shafts 2 and 34, and is fixed to the motor shaft 34 via a joint 42. By this fixing, the planetary frame 40 can rotate around the rotational axial line O moving together with the motor shaft 34, and can rotate relative to the driving-side rotary element 10. The input part 41 is arranged on the inner periphery side of a center hole 19 which axially penetrates through the bottom wall part 18 of the gear member 12, and supports the driving-side rotary element 10 through a bearing 43 from the inner periphery side of the center hole 19.

As shown in FIGS. 1 and 3, in the planetary frame 40, an eccentric part 44 which locates closer to the fixed part 21 than the input part 41 is of a tubular type in which the outer periphery wall is off-set relative to the rotary elements 10, 20 and shafts 2, 34. The eccentric part 44 is arranged on the inner periphery side of the center hole 51 which axially penetrates through the planetary gear 50, and supports the planetary gear 50 through the bearing 45 from the inner periphery side of the center hole 51. By this supporting, the planetary gear 50 can rotate around the eccentric axial line P which is the central axial line of the outer periphery wall of the eccentric part 44, and can rotate toward the rotational direction of the eccentric part 44. In other words, the planetary gear 50 is arranged to be capable of performing the planetary motion.

As shown in FIGS. 1 to 4, the planetary gear 50 is of a two-step tubular type, and the tip circle forms the driving-side external gear part 52 and the driven-side external gear part 54 existing on the outer periphery side of the bottom circle respectively by the larger diameter portion and the smaller diameter portion. Here, the number of the teeth of the driving-side external gear part 52 is set smaller by a predetermined number N (one tooth in this embodiment) than the number of the teeth of the driving-side internal gear part 14. And the number of the teeth of the driven-side external gear part 54 is set smaller by the predetermined number N than the driven-side internal gear part 22. Accordingly, the number of the teeth of the driven-side external gear part 54 is smaller than the number of the teeth of the driving-side external gear part 52. The driving-side external gear part 52 is arranged on the inner periphery side of the driving-side internal gear part 14, and meshed with a part of the gear part 14. Further, the driven-side external gear part 54 which is located closer to the fixed part 21 than the driving-side external gear part 52 is arranged on the inner periphery side of the driven-side internal gear part 22, and meshed with a part of the gear part 22.

Figure 6:
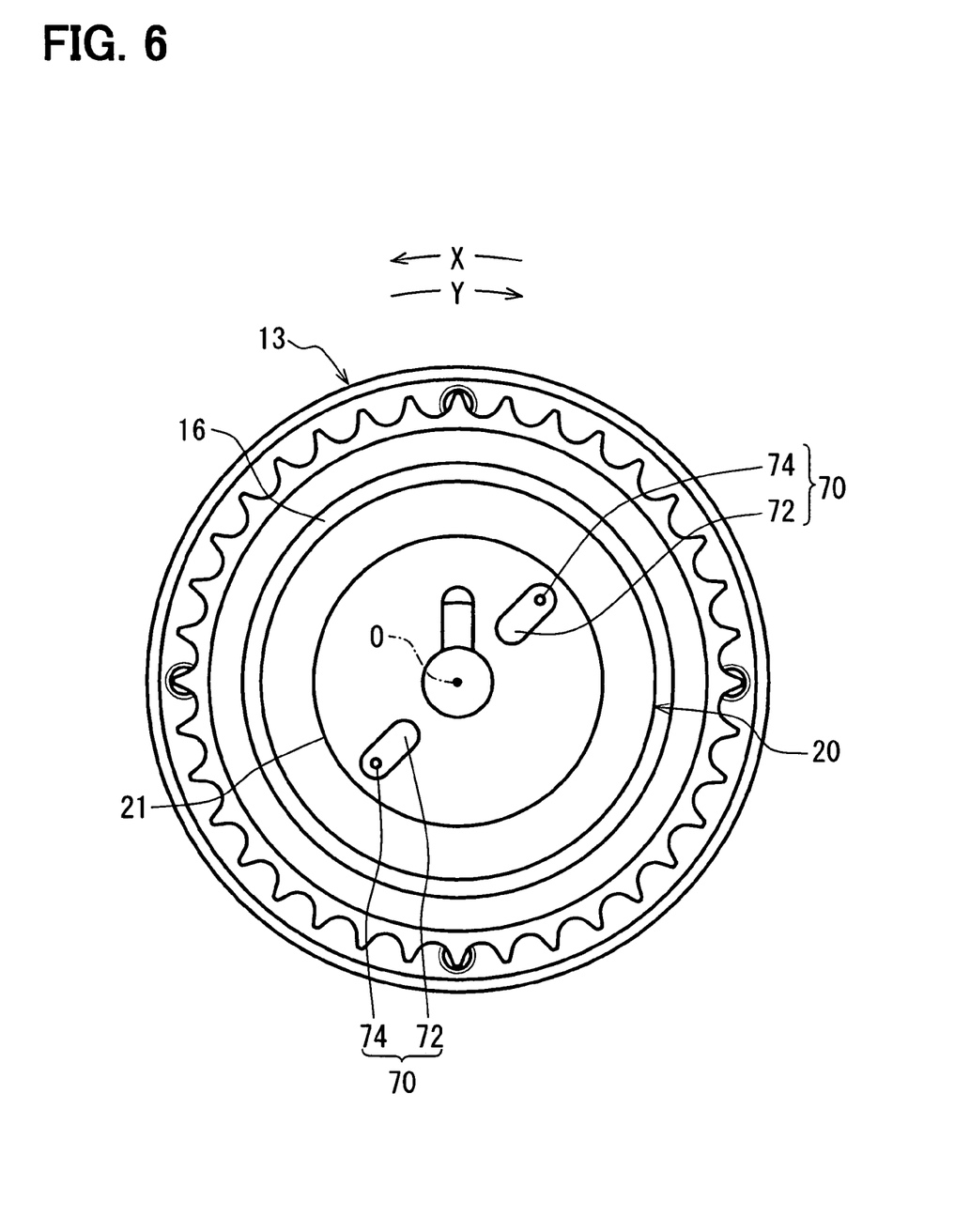
FIG. 6 is a side view showing the valve timing controller.

Two guide holes 70 are formed on the fixed part 21 to guide a lubricating oil into an inside space 11 of the rotary elements 10 and 20, as shown in FIGS. 1 and 6. These guide holes 70 are respectively provided at two locations which are symmetrical each other with respect to the rotational axial line O, and are arranged at equal intervals in the circumferential direction of the fixed part 21 which coincides with the common circumferential direction of the internal gear parts 14 and 22. At respective guide holes 70, upstream side orifice parts 72 are long and in a flat slotted-hole shape in the radial direction of the fixed part 21. Here, the entrance parts of the orifice part 72 are communicated with a corresponding one out of two supply holes 5 to which the lubricating oil is discharged for supplying from a pump 4 in the camshaft 2, and a flow-path area of the orifice part 72 is more reduced than the flow-path area of the corresponding supply hole 5.

Furthermore, a guide part 74 located at the downstream side of the orifice part 72 in each guide hole 70 is in a tubular-hole shape extending in the axial direction of the fixed part 21. Here, an outlet part of the guide part 74 is open further toward the inner peripheral side than a tip circle 86 of the driven-side internal gear part 22, thereby communicating with the inside spaces 11 of the rotary elements 10 and 20.

As shown in FIGS. 1, and 5, in the gear member 12, nine discharge holes 80 for discharging the lubricating oil to the outside from the inside spaces 11 are formed at a bottom wall part 18 located at the opposite side of the fixed part 21 interposing the differential gear system 60. These discharge holes 80 are mutually arranged with prescribed intervals in the circumferential direction of the bottom wall part 18 which coincides with the common circumferential direction of the internal gear parts 14, 22, and respectively exhibit tubular hole shape penetrating through the bottom wall part 18 in the axial direction. Here, the outlet part of the discharge hole 80 is open toward the outside space between the bottom wall part 18 and the electric motor 32. Moreover, the entrance part of the discharge hole 80 is open toward a tooth groove 88 of the driving-side internal gear part 14, thereby communicating with the inside space 11.

By the arrangement described above, in the inside space 11 of the rotary elements 10, 20, the differential gear system 60 which is formed by combining the driving-side internal gear part 14 with the driven-side internal gear part 22 through the planetary gear 50 is formed on the outer periphery side of the eccentric part 44. When the planetary frame 40 does not rotate relative to the driving-side rotary element 10, the planetary gear 50 rotates together with the rotary elements 10, 20 while maintaining meshed positions of the external gear parts 52, 54 with the internal gear parts 14, 22. As a result, the relative rotational phase between the rotary elements 10, 20 is maintained, so that the valve timing is also maintained. When the planetary frame 40 is rotated in the advance direction X with an increase of the rotational torque in the X direction, the driven-side rotary element 20 rotates in the advance direction X by operating the planetary gear 50 in the planetary motion while shifting the meshing position of the external gear parts 52, 54 with the internal gear parts 14, 22. Accordingly, the valve timing is shifted toward the advance side. Furthermore, when the planetary frame 40 is relatively rotated in the retard direction Y relative to the element 10 with the increase of the rotational torque in the Y direction and an abrupt stop of the electric motor 32, the driven-side rotary element 20 rotates in the retard direction Y relative to the element 10, by operating the planetary gear 50 in the planetary motion while shifting the meshing positions of the external gear parts 52 and 54 with the internal gear parts 14 and 22. Accordingly, when the valve timing is shifted toward the retard side, and particularly when the electric motor 32 is abruptly stopped, the valve timing of the most retard phase which enables starting of the internal combustion engine can be realized.

Now, a characteristic portion of the valve timing controller 1 will be described in more detail.

As shown in FIG. 1, the eccentric part 44 supports the planetary gear 50 through the bearing 45. The bearing 45 is engaged with the eccentric part 44 in such a manner as to make a clearance gap therebetween. That is, the clearance gap is formed between an outer surface 44a of the eccentric part 44 and an inner surface 45b of the bearing 45. Hence, the external gear parts 52, 54 of the planetary gear 50 can move in the axial direction while engaging with the internal gear parts 14, 22. A stopper 49 is formed on an outer surface of the planetary frame 40. The bearing 45 abuts on a stopper 49. Hence, an axial movement of the planetary gear 50 is restricted in left direction in FIG. 1.

A spacer 67 and a snap ring 69 are provided on an opposite end of the planetary flame 40 with respect to the stopper 49. The stopper 49 and the snap ring 68 define an axial clearance (thrust clearance) therebetween. The planetary gear 50 and the spacer 67 are provided in the axial clearance in such a manner as to be sandwiched between the stopper 49 and the snap ring 69.

According to a width of the spacer 67, the axial clearance is varied to a set clearance.

A biasing member 68 is disposed between the spacer 67 and the snap ring 69. The biasing member 68 is a disc spring which biases the planetary gear 50 toward the stopper 49.

Figure 2A:
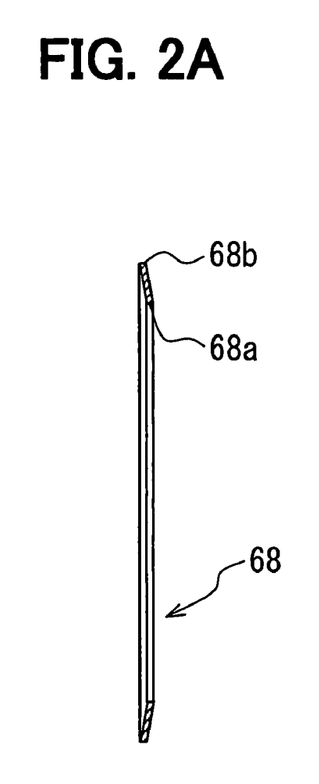
FIG. 2A is a cross sectional view showing a biasing member.
Figure 2B:
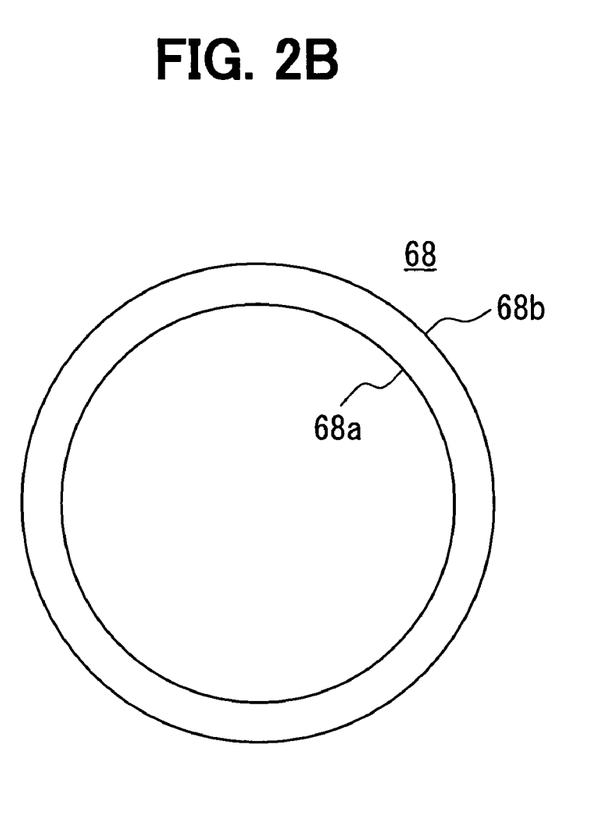
FIG. 2B is a plain view showing the biasing member.

As shown in FIG. 2, the biasing member 68 is an annular disc spring having an inner periphery 68a and an outer periphery 68b. The inner periphery 68a is detachably engaged with an engagement surface 44c which is formed on the outer surface 44a of the eccentric part 44. The snap ring 69 is engaged with a step portion 44d which is formed on the engagement surface 44c. The biasing member 68 is provided between the spacer 67 and the snap ring 69. That is, the biasing member 68 is provided in a gap clearance between the spacer 67 and the snap ring 69. This gap clearance corresponds to the axial clearance.

Since the biasing member 68 biases the planetary gear 50 toward stopper 49, a displacement of the planetary gear 50 relative to the planetary flame 40 is effectively restrained. While the planetary gear 50 performs the planetary motion, the axial movement of the planetary gear 50 is well restrained.

In the embodiment described above, the valve timing controller 1 controls the valve timing of the intake valve. The present invention may also be applied to a controller for controlling a valve timing of the exhaust valve, and a controller for controlling the valve timing of both of the intake valve and the exhaust valve. Besides, in the embodiment described above, the rotary element 10 is linked to a motion of the crankshaft and the rotary element 20 is linked to a motion of the camshaft 2. However, it may be arranged such that the rotary element 10 is linked to a motion of the camshaft 2 and the rotary element 20 is linked to a motion of the crankshaft.

In the above embodiment, the driving-side internal gear part 14 is brought to be contact with the driven-side internal gear part 22. Alternatively, the internal gear part 14 and the internal gear part 22 can be arranged in such a manner as to be apart from each other.

In the above embodiment, the planetary gear 50 has the external gear parts 52, 54. Alternatively, the planetary gear 50 can have internal gear parts instead of the external gear parts 52, 54.

The biasing member can be formed by elastic material such as resin material or rubber material.

What is claimed is:

1. A valve timing controller for controlling valve timing of at least one of an intake valve and an exhaust valve, comprising:

a first rotary element rotating in response to one of the crankshaft and the camshaft, and including a first gear part;

a second rotary element rotating in response to the other of the crankshaft and the camshaft, and including a second gear part;

a planetary gear including a third gear part and a fourth gear part which respectively engage with the first gear part and the second gear part, the planetary gear performing a planetary motion to vary a relative rotational phase between the first rotary element and the second rotary element;

a supporting member supporting the planetary gear in such a manner that the planetary gear is slidable in its axial direction between the first rotary element and the second rotary element; and an elastic member restricting a displacement of the planetary gear in its axial direction.

2. A valve timing controller according to claim 1, wherein the elastic member is a biasing member which biases the planetary gear toward the supporting member.

3. A valve timing controller according to claim 1, wherein the supporting member is coaxially disposed with respect to one of the first rotary element and the second rotary element, and includes an eccentric shaft which supports the planetary gear to perform a revolution motion of the planetary gear.

4. A valve timing controller according to claim 3, wherein the eccentric shaft includes a planetary flame, the planetary flame rotationally supports an inner periphery of the planetary gear and rotates in an orbit motion direction of the planetary gear.

5. A valve timing controller according to claim 1, wherein the supporting member includes a stopper which restricts an axial movement of the planetary gear in one way, and the planetary gear is sandwiched between the stopper and the elastic member.

6. A valve timing controller for controlling valve timing of at least one of an intake valve and an exhaust valve, comprising:

a first rotary element rotating in response to one of the crankshaft and the camshaft, and including a first gear part;

a second rotary element rotating in response to the other of the crankshaft and the camshaft, and including a second gear part;

a planetary gear including a third gear part and a fourth gear part which respectively engage with the first gear part and the second gear part, the planetary gear performing a planetary motion to vary a relative rotational phase between the first rotary element and the second rotary element;

a supporting member supporting the planetary gear in such a manner that the planetary gear is slidable in its axial direction between the first rotary element and the second rotary element; and an elastic member enlarging an axial clearance which exists between the supporting member and the planetary gear.

* * * * *